(12) United States Patent
Habibi et al.

(10) Patent No.: US 11,790,939 B1
(45) Date of Patent: *Oct. 17, 2023

(54) HEAT SINKING LAYER BETWEEN A SUBSTRATE AND ENCASING LAYERS OF A RECORDING HEAD

(71) Applicant: Seagate Technology LLC, Fremont, CA (US)

(72) Inventors: Helene Parwana Habibi, Londonderry (GB); Vasudevan Ramaswamy, Chaska, MN (US); Raul H. Andruet, Woodbury, MN (US); Neil Zuckerman, Eden Prairie, MN (US); Frank A. McGinnity, Eglinton (GB); Giovanni A. Badini Confalonieri, Londonderry (GB); Martin L. McGarry, Ballymena (GB); James G. Wessel, Savage, MN (US); Pablo G. Levi, Saint Paul, MN (US)

(73) Assignee: Seagate Technology LLC, Fremont, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 17/567,511

(22) Filed: Jan. 3, 2022

Related U.S. Application Data

(63) Continuation of application No. 17/116,107, filed on Dec. 9, 2020, now Pat. No. 11,217,273.

(51) Int. Cl.
*G11B 5/31* (2006.01)
*G11B 5/00* (2006.01)
*G11B 5/60* (2006.01)
*G11B 5/48* (2006.01)

(52) U.S. Cl.
CPC ............ *G11B 5/314* (2013.01); *G11B 5/3163* (2013.01); *G11B 5/4866* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,381,094 B1 | 4/2002 | Gill | |
| 6,396,660 B1 | 5/2002 | Jensen et al. | |
| 6,760,191 B1 * | 7/2004 | Yan | G11B 5/6005 |
| 6,859,343 B1 | 2/2005 | Alfoqaha et al. | |
| 7,170,713 B2 | 1/2007 | Gider et al. | |
| 7,209,329 B2 | 4/2007 | Gill et al. | |

(Continued)

OTHER PUBLICATIONS

U.S. Patent Office issued prosecution for U.S. Appl. No. 17/116,107, filed Dec. 9, 2020, including: Notice of Allowance and Fees Due (PTOL-85) dated Oct. 26, 2021, 5 pages; Applicant Initiated Interview Summary dated Sep. 20, 2021, 2 pages; Non-Final Rejection dated Jun. 29, 2021, 13 pages; 20 pages total.

*Primary Examiner* — Fred Tzeng
(74) *Attorney, Agent, or Firm* — Westman, Champlin & Koehler, P.A.

(57) ABSTRACT

A recording head includes one or more transducer elements, and an electrically insulative layer encasing the one or more transducer elements. The recording head also includes a substrate below the electrically insulative layer. The recording head further includes a heat sinking layer between the electrically insulative layer and the substrate.

20 Claims, 10 Drawing Sheets

(56) References Cited

U.S. PATENT DOCUMENTS

| | | | |
|---|---|---|---|
| 7,320,168 B2 | 1/2008 | Han et al. | |
| 7,649,713 B2 | 1/2010 | Ota et al. | |
| 8,248,894 B2 | 8/2012 | Sasaki et al. | |
| 8,456,968 B1 | 6/2013 | Sasaki et al. | |
| 8,817,425 B1 | 8/2014 | Wu et al. | |
| 9,042,208 B1* | 5/2015 | Knigge | G11B 21/21 369/13.17 |
| 9,799,359 B1 | 10/2017 | Olson et al. | |
| 10,032,468 B1 | 7/2018 | Wessel et al. | |
| 10,147,446 B1 | 12/2018 | Wessel et al. | |
| 10,366,715 B1 | 7/2019 | Ramaswamy | |
| 10,446,181 B1 | 10/2019 | Hutchinson | |
| 10,832,717 B1* | 11/2020 | Cheng | G11B 5/3136 |
| 2003/0067716 A1* | 4/2003 | Chhabra | G11B 5/6005 |
| 2003/0067717 A1* | 4/2003 | Garfunkel | G11B 5/6005 |
| 2003/0193756 A1* | 10/2003 | Kudo | G11B 5/3133 360/313 |
| 2004/0027719 A1 | 2/2004 | Gider et al. | |
| 2004/0070870 A1 | 4/2004 | Hsiao et al. | |
| 2005/0094319 A1 | 5/2005 | Han et al. | |
| 2005/0190495 A1 | 9/2005 | Lille | |
| 2005/0225897 A1* | 10/2005 | Liu | G11B 5/3106 |
| 2005/0237667 A1* | 10/2005 | Chhabra | G11B 5/3136 |
| 2005/0254173 A1* | 11/2005 | Garfunkel | G11B 5/6005 |
| 2007/0247758 A1 | 10/2007 | Kurita et al. | |
| 2010/0118442 A1 | 5/2010 | Kuroki et al. | |
| 2010/0309581 A1* | 12/2010 | Wu | G11B 5/6064 |
| 2013/0286806 A1* | 10/2013 | Wessel | G11B 5/314 369/13.33 |
| 2014/0376340 A1* | 12/2014 | Cheng | G11B 5/3163 29/603.07 |
| 2014/0376343 A1* | 12/2014 | Cheng | G11B 5/3106 29/603.07 |
| 2015/0043316 A1 | 2/2015 | Rea et al. | |
| 2015/0154989 A1* | 6/2015 | Zhao | G11B 5/6088 369/13.33 |
| 2018/0040344 A1 | 2/2018 | Hutchinson et al. | |

* cited by examiner

HEAT SINKING LAYER BETWEEN A SUBSTRATE AND ENCASING LAYERS OF A RECORDING HEAD

CROSS-REFERENCE TO RELATED APPLICATION(S)

This application is a continuation of U.S. application Ser. No. 17/116,107, filed on Dec. 9, 2020, the content of which is hereby incorporated by reference in its entirety.

SUMMARY

In one embodiment, a recording head is provided. The recording head includes one or more transducer elements, and an electrically insulative layer encasing the one or more transducer elements. The recording head also includes a substrate below the electrically insulative layer. The substrate includes a pocket. The recording head further includes a heat sinking layer between the electrically insulative layer and the substrate. At least a portion of the heat sinking layer is in the pocket of the substrate.

In another embodiment, a method of making a recording head is provided. The method includes forming a substrate such that the substrate contains a pocket. The method also includes forming a heat sinking layer, with at least a portion of the heat sinking layer in the pocket. The method further includes forming an electrically insulative layer, encasing one or more transducer elements, over the substrate and the heat sinking layer.

In yet another embodiment, a recording head is provided. The recording head includes a media-facing surface, and one or more transducer elements. The recording head also includes a bottom shield positioned below the one or more transducer elements, and a heater element positioned below the bottom shield. The recording head further includes an electrically insulative layer encasing the one or more transducer elements, the heater element and the bottom shield. A substrate is included below the electrically insulative layer, and a heat sinking layer is included between the electrically insulative layer and the substrate. The heat sinking layer has a lower surface that is in contact with the substrate and an upper surface that is in contact with the electrically insulative layer. An upper portion of the heat sinking layer and the heater element are in a same horizontal plane that is perpendicular to the media-facing surface. The heater element is located behind the upper portion of the heat sinking layer relative to the media-facing surface.

These aspects of the present disclosure are described merely by way of example and not limitation. Other features and benefits that characterize embodiments of the present disclosure will be apparent upon reading the following detailed description and review of the associated drawings.

Figure 1:
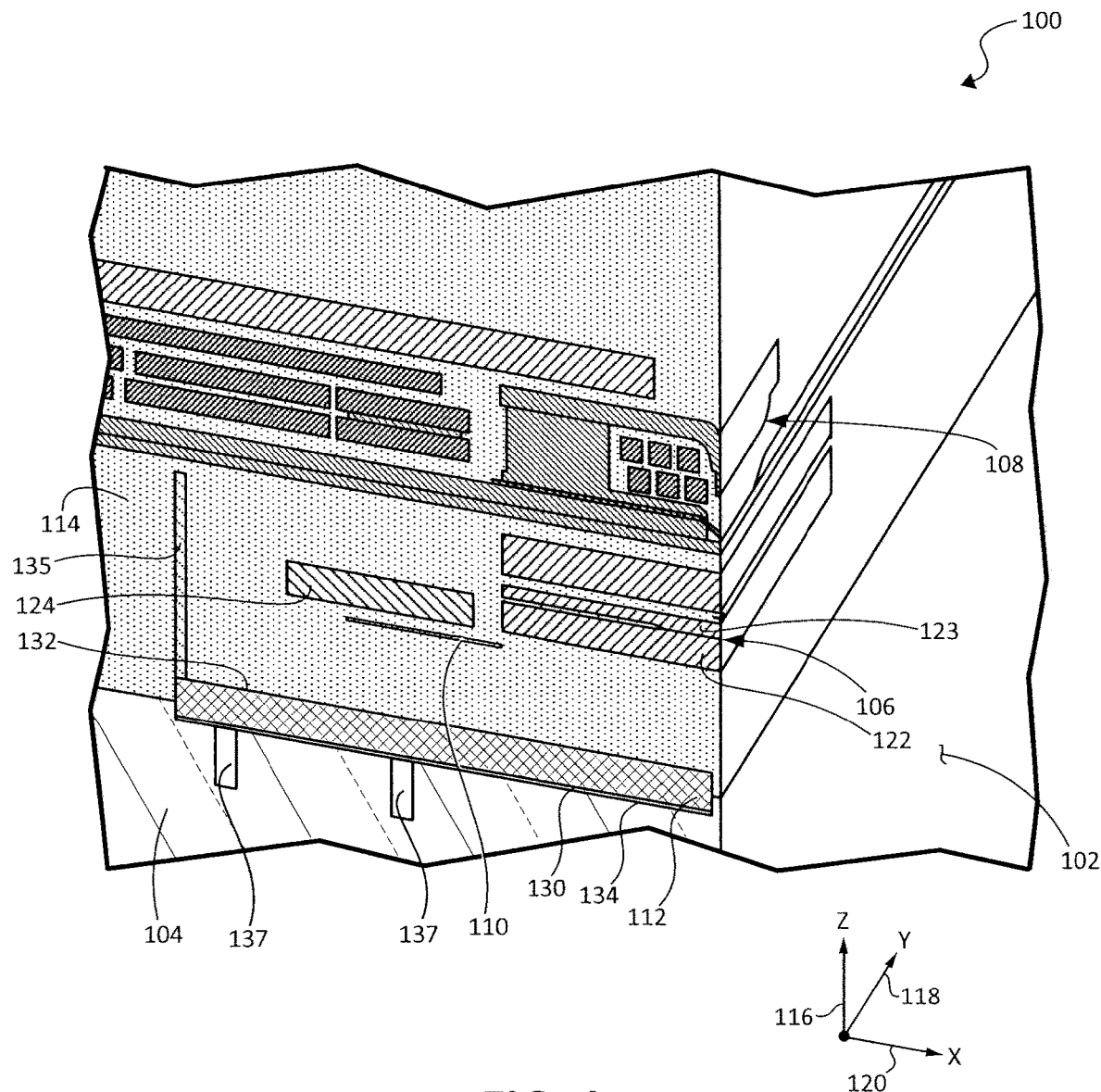
FIG. 1 is a perspective, cross-sectional view of an embodiment of a recording head.

While the above-identified figures set forth one or more embodiments of the present disclosure, other embodiments are also contemplated, as noted in the discussion. In all cases, this disclosure is presented by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features, steps and/or components not specifically shown in the drawings.

DETAILED DESCRIPTION OF ILLUSTRATIVE EMBODIMENTS

Data storage systems commonly have a recording head that includes a read transducer that reads information from a data storage medium and a write transducer that writes information to a data storage medium. Recording heads may also include other components such as a heater that is utilized to actuate, for example, the read transducer and/or the write transducer. Spacing of the recording head from the storage medium affects the strength of the read signal and the strength of the write signal. To achieve higher recording densities, the head is positioned closer to the medium, which decreases a head-medium spacing or fly height. A distance over which transducers are actuated (e.g., by a heater) is referred to as the stroke. In heat-assisted magnetic recording (HAMR) applications a passive fly height may be increased, with a corresponding emphasis on transducer actuation to decrease the spacing between a given transducer and the data storage medium during a reading or writing operation. The transducer actuation may be carried out by heating a region near the transducer to control the head-medium spacing of the transducer. However, the thermal flux into the region of the transducer may also heat the transducer itself, which may degrade transducer performance over time.

Embodiments of the disclosure generally relate to temperature management for transducers in, for example, a HAMR head. In particular, embodiments of the disclosure relate to a heat sinking layer fabricated between a substrate and transducer encasing layers of a recording head.

As will be described in detail further below, the heat sinking layer may include one or more layers of highly thermally conductive material immediately between the substrate and the encasing layer(s), contacting both. The heat sinking layer may also be in direct contact with other structures within the recording head, such as vias, studs, and transducer features. The heat sinking layer may have a thermal conductivity that is higher than either that of the encasing layer material, or of the substrate, or both.

Hard disc drives are a common type of data storage system. The embodiments of the recording head described herein can be used with a hard disc drive. However, other types of data storage systems should be considered within the scope of the present disclosure. The recording head may also be referred to herein as a slider, read/write head, transducer head, etc.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a perspective, cross-sectional view of an embodiment of a recording head 100 with a media-facing surface 102, with the section plane taken normal to the media-facing surface 102. The recording head 100 includes a substrate 104, a reader 106, a writer 108, a heater 110 and a heat sink 112. In alternate embodiments, one or more additional transducers can be provided, for example, an additional reader. Also, in some embodiments, the recording head 100 may include a single transducer (e.g., a single writer and no reader(s) or a single reader and no writer(s)). The substrate 104 can be formed of a ceramic material, such as AlOTiC, or other suitable materials. The reader 106 and the writer 108 may be transducers capable of reading and writing, respectively, information from or to a magnetic storage medium, such as using HAMR techniques. The particular configuration of the reader 106 and the writer 108 may vary as desired for particular applications. The heater 110 may be positioned proximate to the reader 106, and can generate thermal energy when provided with electrical current. In should be noted that, in different embodiments, any suitable number of heaters may be employed. An electrically insulative material 114, such as an electrically insulative ceramic material like $Al_2O_3$, may be provided around the reader 106, the writer 108, the heater 110, and other components to support them on the substrate 104.

A storage medium (not shown), with which recording head 100 interacts, may be configured with discrete tracks that store data. Thus, the recording head 100 can be described relative to a down-track direction indicated by arrow 116 and a cross-track direction indicated by arrow 118, which is arranged normal to arrow 116. Height is defined as the dimension along the X-axis 120.

In the embodiment shown in FIG. 1, heater 110 is located on a different substrate-parallel plane (xy-plane in this drawing) than a closest shield (e.g., a bottom shield 122) of the reader 106. A top shield 123 is located above the reader 106. In general, heater 110 may be positioned at any suitable location. As indicated above, heater 110 causes local thermal expansion in response to an applied current. A push block 124 is located above heater 110 and expansion of the push block 124 due to the local heating causes protrusion of the reader 106 from the media-facing surface 102, which pushes the reader 106 closer to the recording medium (not shown). The push block 124 may be formed of a material with high coefficient of thermal expansion, which increases stroke efficiency.

As indicated above, thermal flux into the region of the transducer (e.g., reader 106) may also heat the transducer (e.g., reader 106) itself, which may degrade transducer (e.g., reader 106) performance over time. To address this, recording head 100 employs heat sink or heat sinking layer 112 to conduct heat away from, for example, reader shields 122, 123 and towards the substrate 104. Thermal vias or other such structures, which are not shown, in FIG. 1 may be included to provide a transfer path for the heat from the region of the reader shields 122, 123 to the heat sinking layer 112.

Heat sinking layer 112 may be positioned between electrically insulative layer 114 and substrate 104. As can be seen in FIG. 1, heat sinking layer 112 has a lower surface 130, which is in contact with the substrate 104, and an upper surface 132, which is in contact with the electrically insulative layer 114. In some embodiments, substrate 104 may be patterned (e.g., etched) to include a pocket 134. In such embodiments, at least a portion of heat sinking layer 112 may be within the pocket 134. In other embodiments, the substrate 104 may be planar (e.g., have an upper surface without a pocket such as 134) and the heat sinking layer 112 may be formed on the planar upper surface of the substrate 104. Heat sinking layer 112 may be formed of a material that is different from a material of the substrate 104 and different from a material of the electrically insulative layer 114. As indicated earlier, the heat sinking layer 112 may have a thermal conductivity that is higher than either that of the electrically insulative layer 114 material, or of the substrate 104, or both.

In the embodiment of FIG. 1 described above, heat sinking layer 112 is shown as a single-layered structure. However, in other embodiments, heat sinking layer 112 may include multiple layers. The different layers of a multi-layered structure may be made of different materials stacked in sequence, combining thermal properties with other desirable properties (mechanical, electrical, etc.). The effective properties of the layer(s) may individually be isotropic or anisotropic. Anisotropy in the completed structure may be created by stacking multiple layers with differing thermal conductivity values.

The layers of the heat sink may be patterned or continuous, and may be formed in multiple steps from multiple materials. The layers may form multiple blocks. The heat sinking layer(s) may extend to the surface of the recording head (e.g., media-facing surface 102 of FIG. 1), or be fully or partially enclosed (e.g., recessed from the media-facing surface 102 as shown in FIG. 1). As indicated above, in addition to the implementation on a planar substrate, the substrate may be patterned (etched) to form pockets or columnar cavities that are then filled with the heat sinking layer(s) of high-thermal-conductivity material. In this fashion the heat sink may be patterned with fins or thermal vias extending into the substrate (e.g., thermal vias 137 in FIG. 1). Thermal vias (e.g., thermal via 135) within insulative layer 114 may provide transfer paths for heat from different regions of the recording head 100 to the heat sinking layer 112.

The heat sinking layer 112 may be deposited directly on the wafer (e.g., substrate 104 of FIG. 1), or it may be fabricated separately, and transfer-printed onto the final substrate 104 wafer. Patterning operations on the transfer-printed layer may be performed before or after printing.

As indicated above, the heat sinking layer 112 is made of a thermally-conductive solid. In general, the heat sinking layer may be used as a heat conduction pathway (a heat sink) to manage temperature of parts of the recording head. The temperature management may serve a function to provide device reliability, or to reduce thermal expansion and resulting protrusion of regions of the head. As examples, the high-thermal-conductivity film may be used as a heat sink pathway to prevent excessive temperature of a laser diode, a recording head reader, magnetic shields, a Near-Field Transducer, or electromagnetic writer coils and magnetic poles. The heat may be immediately sunk to the substrate. Heat entering the highly-conductive layer may be conducted from the layer to the external fluid flow at the media-facing surface (e.g., air bearing surface) or on other slider surfaces. The layer may be selected to have a particular specific or volumetric heat capacity. For example, a layer with high heat capacity can be used to damp out increases and decreases in temperature associated with on-off switching of devices (e.g. a laser), or other variations in device power load. Example high-conductivity films include metals such as copper (Cu) and gold (Au). As other example materials, monocrystalline or aligned polycrystalline dielectric materials such as diamond or aluminum nitride (AlN) may serve as thermally-conductive layers. In still other embodiments, sapphire may be utilized to form the thermally-conductive layer. Additional examples of different recording head embodiments with thermally-conductive layers are described below in connection with FIGS. 2A through 6.

Figure 2A:
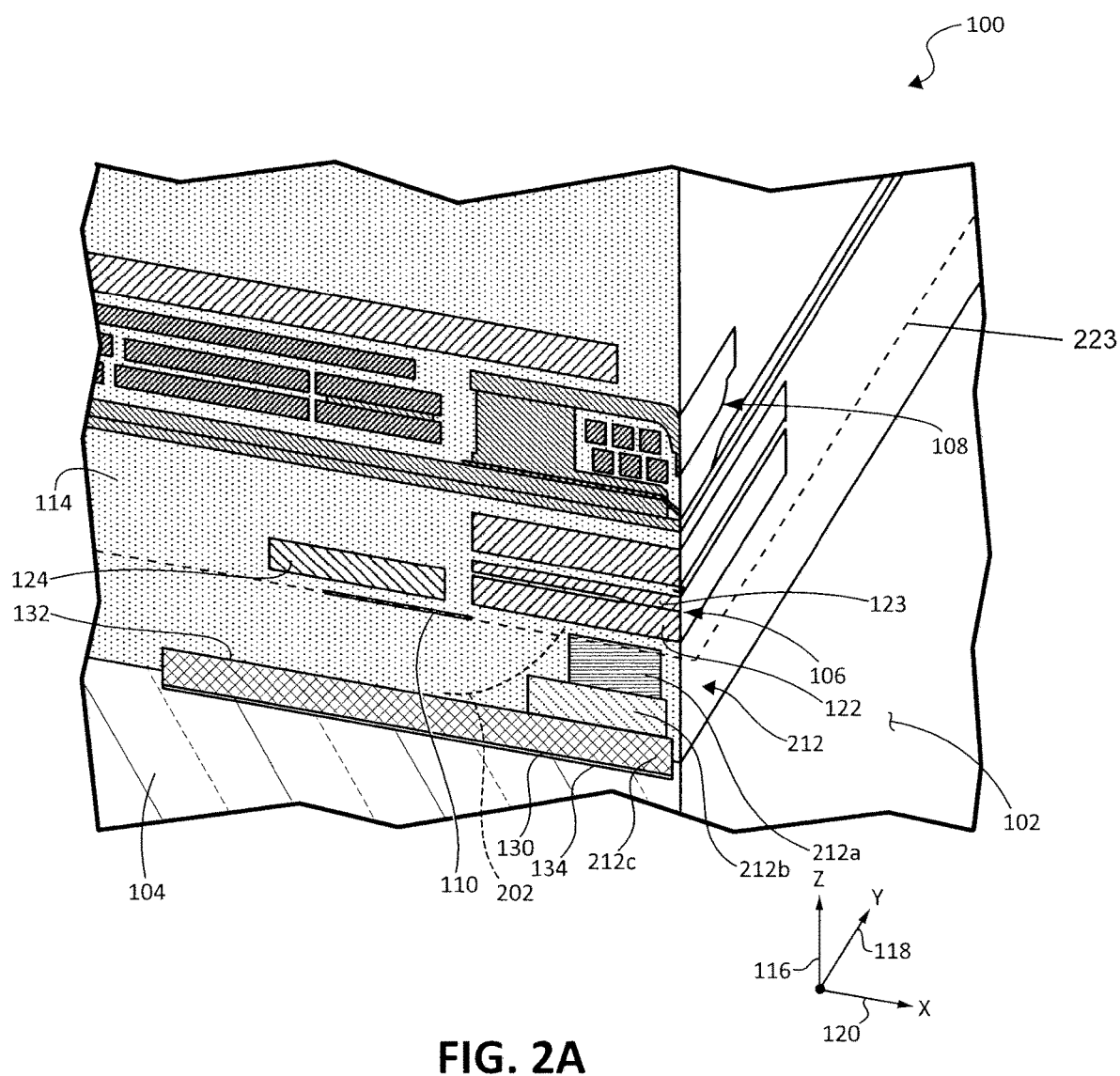
FIG. 2A is a perspective, cross-sectional view of an embodiment of a recording head.

FIG. 2A is a perspective, cross-sectional view of an embodiment of a recording head 200 that includes a multi-layered heat sink in accordance with one embodiment. In general, recording head 200 includes elements similar to those included in recording head 100 of FIG. 1. In the interest of brevity, descriptions of the similar elements are not repeated in connection with FIG. 2A. In recording head 200, heat sink 212, which conducts heat away from the reader shields 122, 123 and towards a substrate 104, includes a first sinking layer 212a that is in close proximity to the read shield 122. A second heat sinking layer 212b joins the first heat sinking layer 212a. The second heat sinking layer 212b may extend farther away from the media-facing surface 102 than the first heat sinking layer 212a. A third heat sinking layer 212c, which may at least partially be within substrate pocket 134, may extend even farther away from the media-facing surface 102 than the other portions 112a-b, even past the heater 110.

As can be seen in FIG. 2A, front surfaces of heat sinking layers 212a-c may have different recessions from the media-facing surface 102. In a particular embodiment, a recession of the front surface of heat sinking layer 212a is about 0.75 micrometers (µm), a recession of the front surface of heat sinking layer 212b is about 0.5 µm and a recession of heat sinking layer 212c is about 0.25 µm. In other embodiments, one or more of heat sinking layers 212a-c may not be recessed (e.g., may have front surfaces that are part of the media-facing surface 102). In general, heat sinking layers 212a-c may not be recessed, may all have the same recession from the media-facing surface 102, or may have different recessions from the media-facing surface 102.

Different heat sinking layers 212a-c may be made of a same high-thermal-conductivity material, or each different heat sinking layer 212a, 212b, 212c may be made of a different high-thermal-conductivity material. In general, any suitable high-thermal-conductivity materials, some examples of which are provided above, may be utilized to form layers 212a-c.

It should be noted that, in some embodiments, the substrate 104 may be planar (e.g., have a planar upper surface without a pocket such as 134) and the heat sinking layer 212c may be formed on the planar upper surface of the substrate 104. It should also be noted that, in some embodiments, instead of forming the heat sink 212 from staggered rectangular layers/portions, the heat sink 212 may formed of a continuous shape, e.g., with a smooth, curved, surface (shown by dashed line 202).

Generally, the heat sink 212 allows sufficient localized heating to cause expansion near push block 124, while preventing excessive heating of the reader 106. By drawing heat away from the reader 106 near the reader shields 122, 123, the reader 106 temperature can remain lower than if the region occupied by the heat sink 212 were filled by a dielectric such as alumina. Heat sink layer 212c may be sized/shaped to reduce heat transfer (e.g., via conductance and/or radiation) directly from the heater 110, thereby not reducing the effectiveness of the heater 110. Also, a separation distance between a hot-spot-producing region of heater 110 and a rear end of layer 212a is such that heat transfer from heater 110 directly to the heat sinking layer 212a is reduced. Heaters 110 of different shapes may produce hot spots at different distances from the media-facing surface 102, although front ends of the different heaters 110 may be at a same distance from the media-facing surface 102. The hot spots are formed along the narrower regions of the heaters, and are influenced by the Joule heating in the entire length of the heater, as well as the conductance of other local features, such as the push block 124, shields 122, and the heat sinking layer(s) 212. In one embodiment, an upper portion of the heat sinking layer 212a and the heater element 110 are in the same horizontal plane 223 that is perpendicular to the media-facing surface 102. Examples of two different heaters having different shapes and producing hot spots at different locations are provided below in connection with FIGS. 2B and 2C.

Figure 2B:
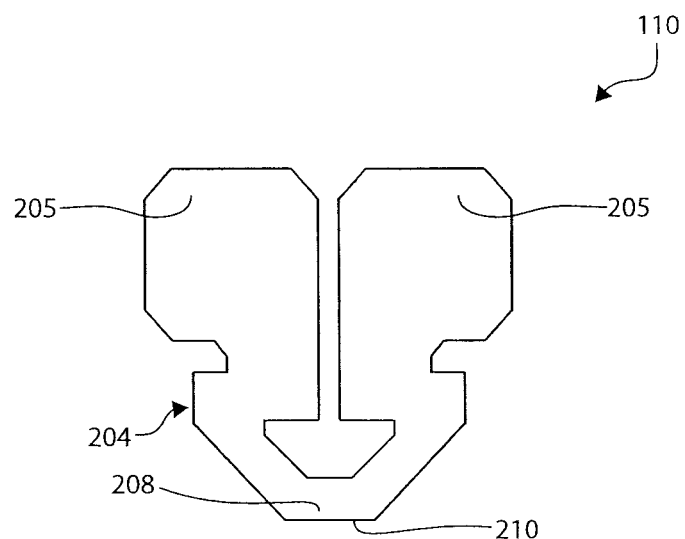
FIG. 2B is an elevation view of one embodiment of a heater that may be employed in the recording head of FIG. 2A.

FIG. 2B is a top view of one embodiment of a heater 110, shown in isolation. The heater 110 includes a heater element 204 and electrical connection pads 206. A shape of heater element 204 produces a hot spot 208 substantially at a front end (end closest to the media-facing surface of recording head 200) 210 of the heater 110.

Figure 2C:
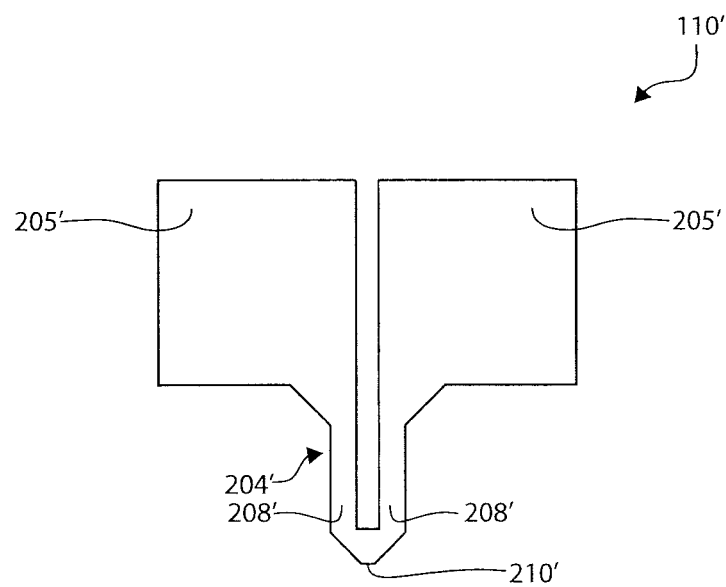
FIG. 2C is an elevation view of another embodiment of a heater that may be employed in the recording head of FIG. 2A.

FIG. 2C is a top view of another embodiment of a heater 110', shown in isolation. The heater 110' includes a heater element 204' and electrical connection pads 206'. A shape of heater element 204' produces a hot spot 208' behind the front end 210' of the heater 110'. Since hot spot 208' is farther away from the media-facing surface 102 than hot spot 208, when recording head 200 employs heater 110', heat sinking layer 212a may have a greater height relative to a height of heat sinking layer 212a employed for recording head 200 with heater 110.

There are additional reasons why a designer might choose heater 110 of FIG. 2B, or heater 110' of FIG. 2C, or another design. The location and extent of the heated regions created by heaters (e.g., 110 and 110') directly affect the shape of the head's protrusion, the electrical power employed to actuate it, and ultimately the temperature rise of the heater (e.g., 110, 110') and nearby features. In the example of a reader heater, the heater design is adjusted such that the reader (e.g., 106) is at the most-protruded part of the protruded bump, and will be at the point that becomes closest to the disc during actuation.

Figure 2D:
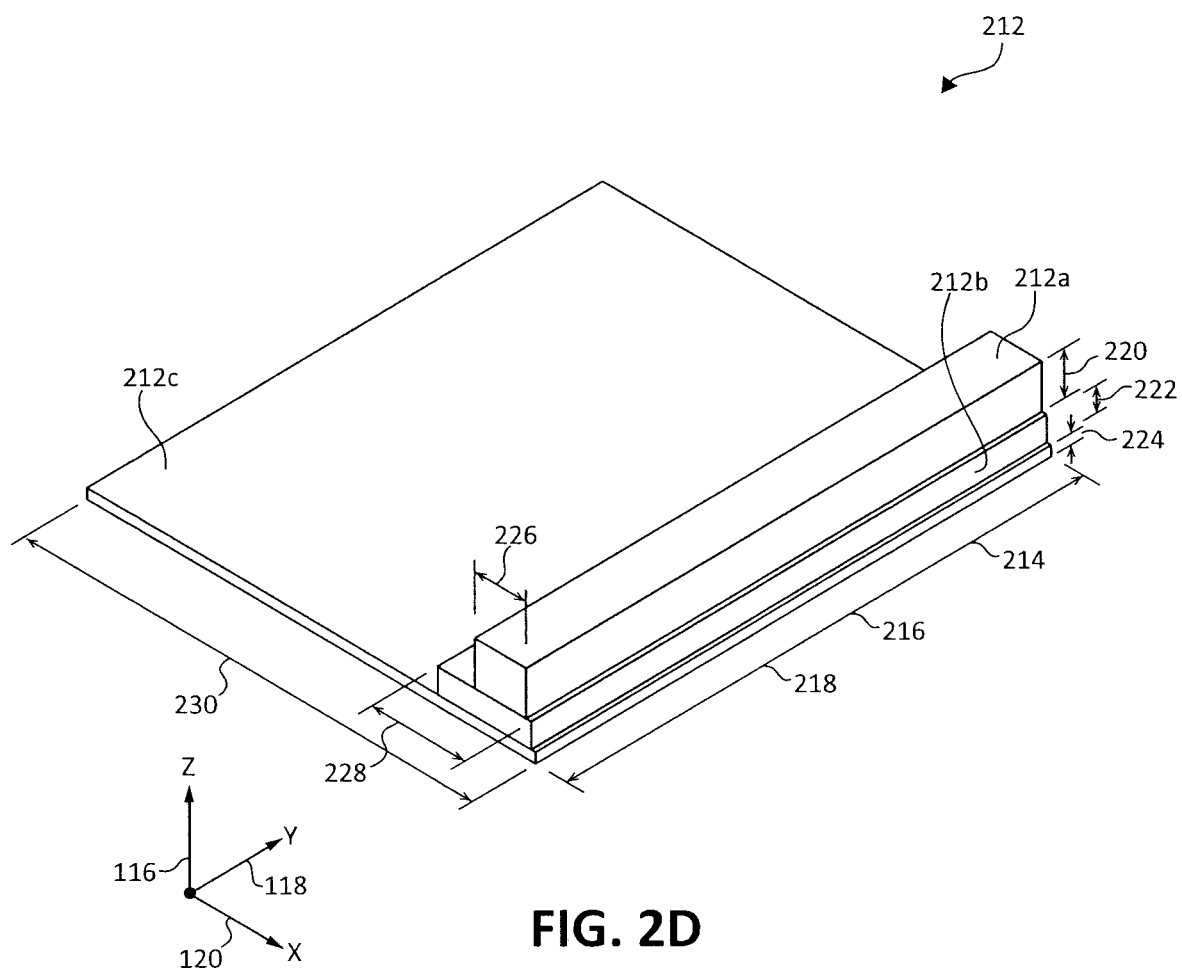
FIG. 2D is a perspective view of a heat sinking layer that may be employed in the recording head of FIG. 2A.

FIG. 2D is a perspective view of heat sink 212 of FIG. 2A. In FIG. 2D, widths of heat sinking layers 212a, 212b and 212c are denoted by reference numerals 214, 216 and 218, respectively. In the embodiment shown in FIG. 2D, widths 214, 216 and 218 are substantially the same, and may be about 40 μm in a particular embodiment. In general, layers 212a-c may have any suitable widths (same or different). Thicknesses of heat sinking layers 212a, 212b and 212c are denoted by reference numerals 220, 222 and 224, respectively. In a particular embodiment, thickness 220 is about 3.3 μm, thickness 222 is about 1.75 μm, and thickness 224 is about 750 nanometers (nm). In general, heat sinking layers 212a-c may have any suitable thicknesses (same or different). Heights of heat sinking layers 212a, 212b and 212c are denoted by reference numerals 226, 228 and 230, respectively. In a particular embodiment, height 226 is about 5 μm, height 228 is about 7.25 μm and height 230 is about 34.5 μm. In general, heat sinking layers 212a-c may have any suitable heights (same or different).

In additional to substantially optimizing thermal management functions of the heat sinking layer 212 in recording head 200, an impact of the heat sinking layer 212 on other properties (e.g., magnetic and electrical properties) of the recording head 200 may be taken into consideration by the designer. For example, first heat sinking layer 212a may be proximate to, but not in contact with, bottom shield 122 because forming shield 122 directly on layer on layer 212a may impart a particular topography to a bottom surface of shield 122, which may negatively impact magnetic properties of the shield 122. Further, a very small separation distance between the first heat sinking layer 212a and the bottom shield 212 may lead to capacitance-related problems because elements 122 and 212a may be electrically conductive with dielectric material 114 between them. Providing a larger separation distance between bottom shield 122 and first heat sinking layer 212a may alleviate the capacitance-related problem, but may negatively impact thermal management functions. Thus, in one embodiment, an optimal separation distance of about 200 nm between the bottom surface of shield 122 and the top surface of layer 212a may be employed. Additionally, or alternatively, layer 212a may have a non-uniform cross-section in the cross-track direction 118 such that, for example, an area of the upper surface of layer 212a is greatest directly under reader 106 and decreases in portions that are not directly under reader 106, thereby decreasing the overall area of the upper surface of layer 212a and thus reducing capacitance. In general, the separation distance between the bottom surface of shield 122 and the top surface of layer 212a and/or areas of the bottom surface of shield 122 and/or the top surface of layer 212a may be selected such that the capacitance is below a predetermined threshold. It should be noted that one or more of layers 212a-c may have non-uniform cross-sections in the cross-track direction 118.

Figure 3A:
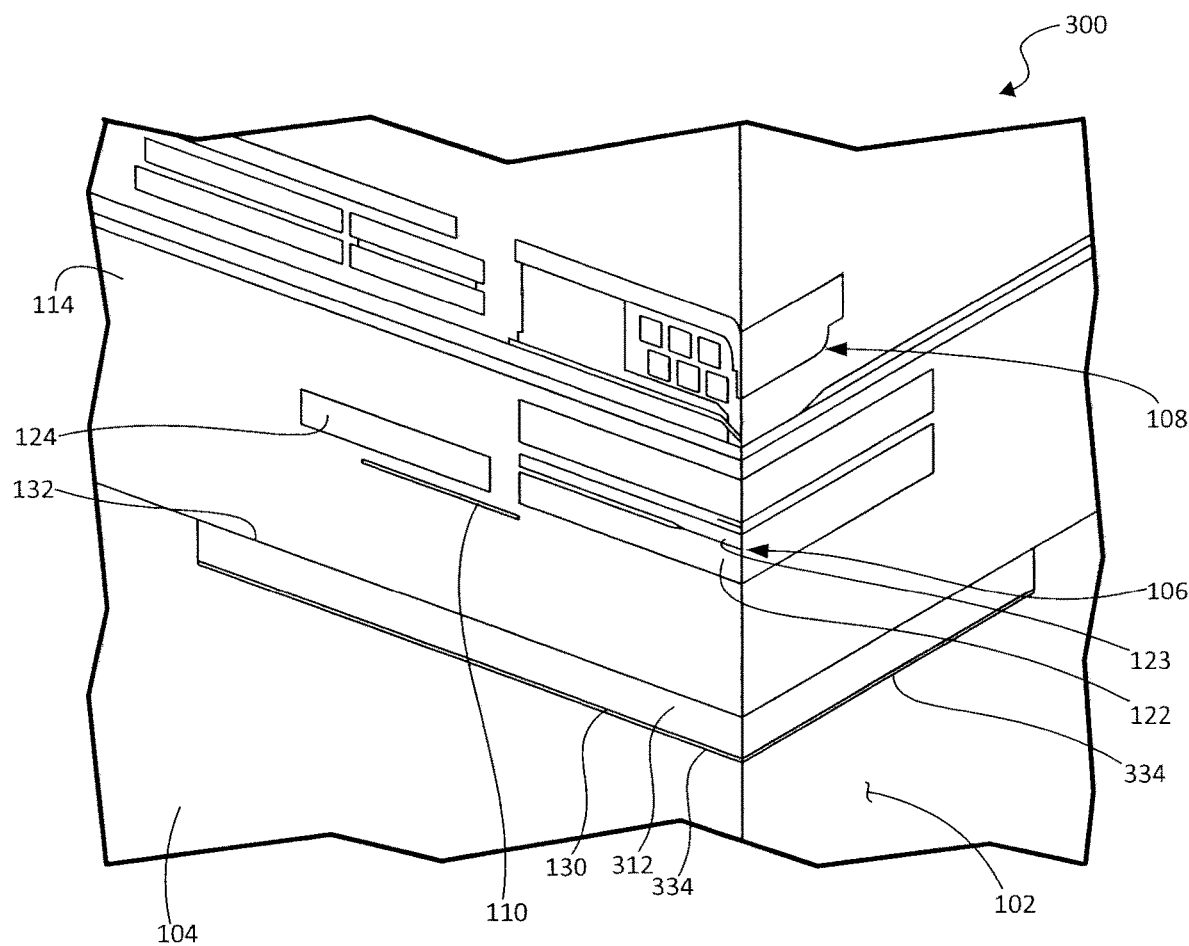
FIG. 3A is a perspective, cross-sectional view of an embodiment of a recording head.
Figure 3B:
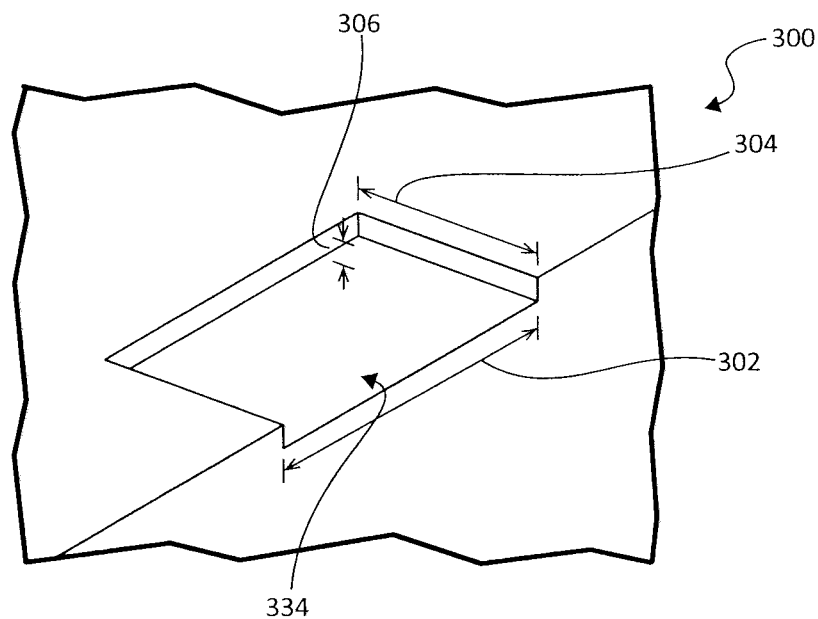
FIG. 3B is a perspective view of a substrate of the recording head of FIG. 3A.
Figure 3C:
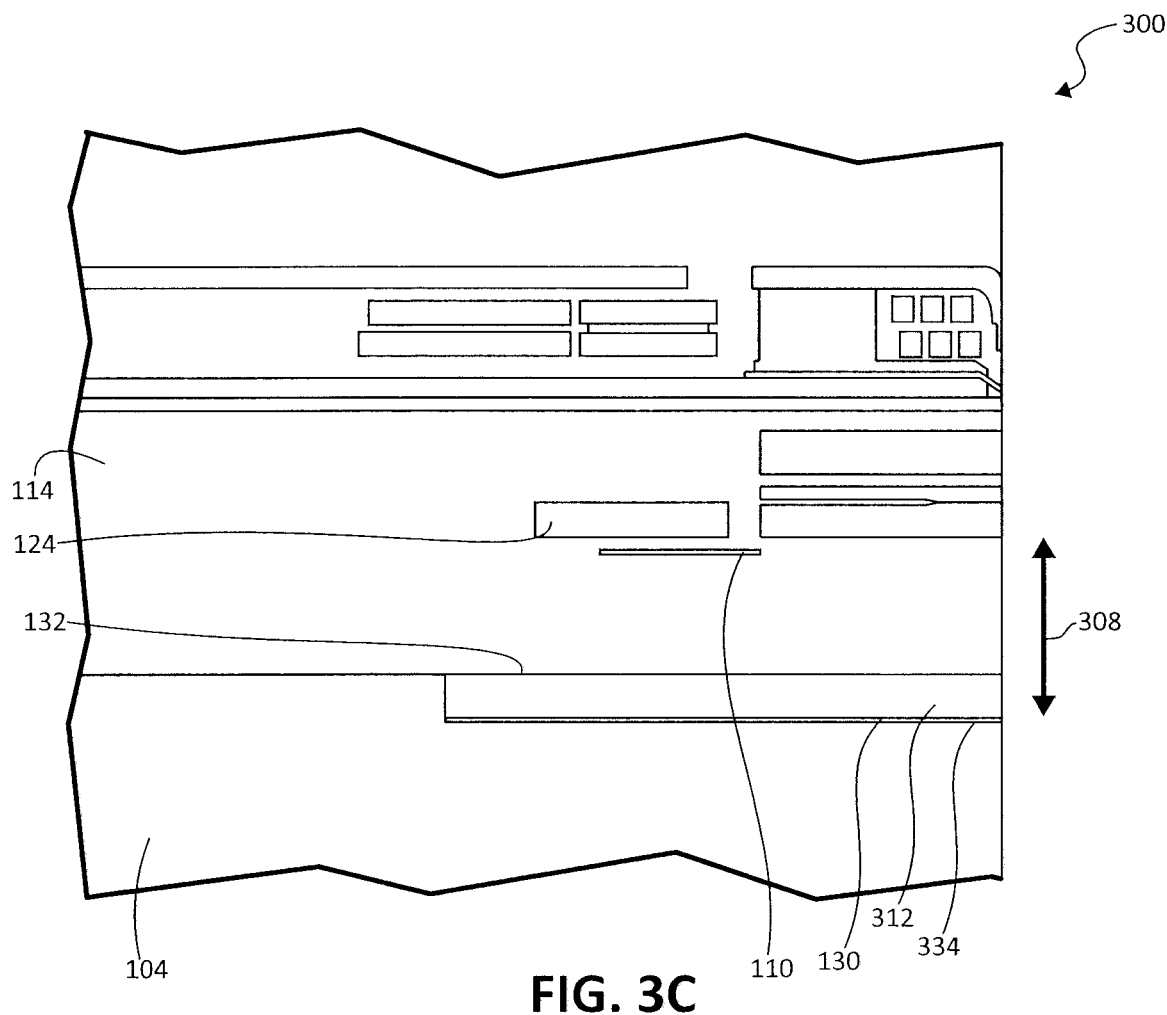
FIG. 3C is a side cross-sectional view of recording head of FIG. 3A.

FIG. 3A is a perspective, cross-sectional view of an embodiment of a recording head 300 with a media-facing surface 102, with the section plane taken normal to the media-facing surface 102. FIG. 3B is a perspective view of a substrate 104 of recording head 300, and FIG. 3C is a side cross-sectional view of recording head 300. Recording head 300 includes elements similar to those included in recording heads 100 (of FIG. 1) and 200 (of FIG. 2A), and therefore, in the interest of brevity, a description of the similar elements is not repeated.

As can be seen in FIGS. 3A and 3C, recording head 300 includes a single heat sinking layer 312, which is entirely in a substrate pocket 334. Pocket 334 may be patterned (e.g., etched) into the substrate 104, and the heat sinking layer 312 may be deposited into the pocket 334. In a particular embodiment, dimensions of pocket 334, which are denoted by reference numerals 302, 304 and 306 in FIG. 3B, are about 5 μm, 60 μm and 70 μm, respectively. In general, pocket 334 may have any suitable dimensions. In FIG. 3C, a distance from a bottom of the pocket 334 and a bottom of reader shield 122 is denoted by reference numeral 308. In a particular embodiment, distance 308 is about 11 μm. In general, any suitable distance 308 may be employed. Distance 308 is a sum of a depth of pocket 334 (or a thickness of heat sinking layer 312) and a separation distance between a top of heat sinking layer 312 and the bottom of reader shield 122. A designer can maintain the separation distance between the top of the heat sinking layer 312 and the bottom of reader shield 122 at a predetermined/constant value and change the volume of heat sinking layer 312 by making corresponding changes to the dimensions (e.g., depth) of pocket 334. This is an advantage of employing a pocket such as 334 instead of depositing a heat sinking layer such as 312 over a planar substrate.

Figure 4A:
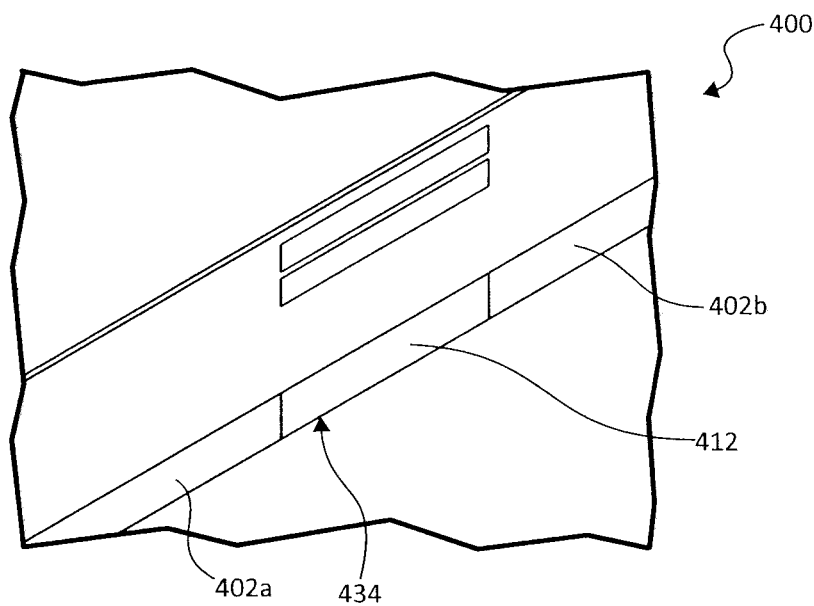
FIG. 4A is a perspective view of an embodiment of a recording head.
Figure 4B:
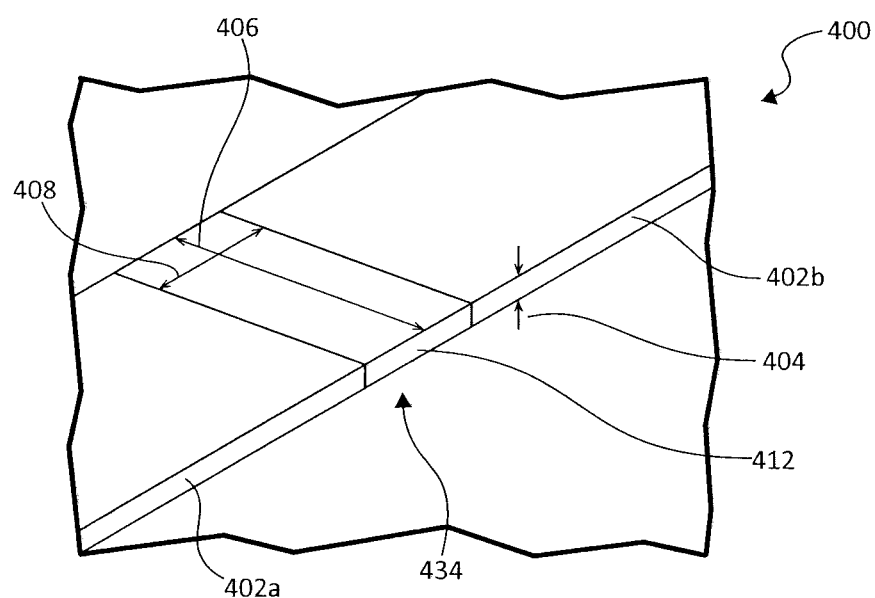
FIG. 4B is a perspective view of a substrate and basecoat portion of the recording head of FIG. 4A.
Figure 4C:
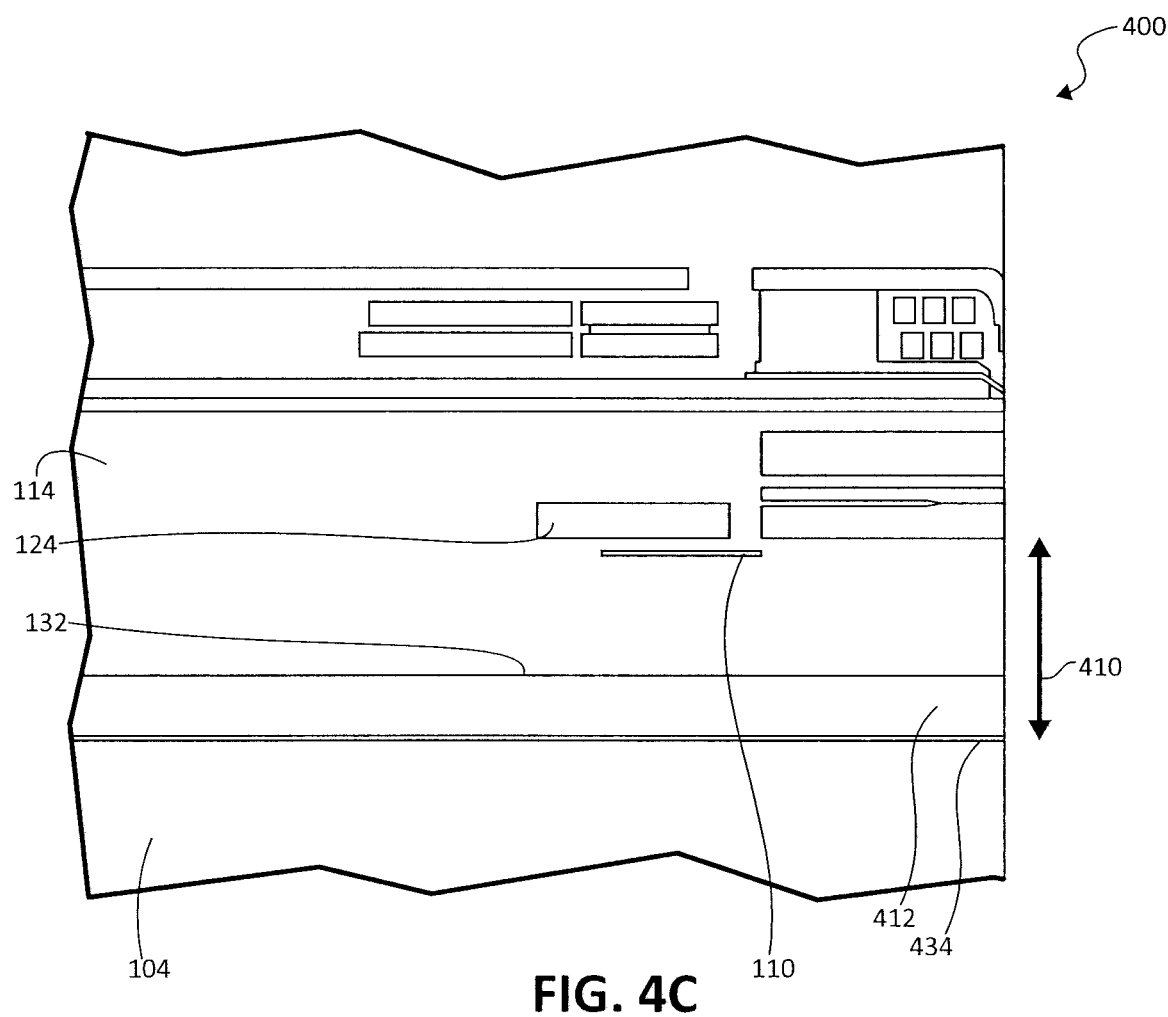
FIG. 4C is a side cross-sectional view of the recording head of FIG. 4A.

FIG. 4A is a perspective view of an embodiment of a recording head 400 with a media-facing surface 102. FIG. 4B is a perspective view of a substrate and basecoat portion of recording head 400, and FIG. 4C is a side cross-sectional view of recording head 400. The embodiment of FIGS. 4A, 4B and 4C is a "basecoat pocket" embodiment, which is an alternative for the "substrate pocket" embodiment of FIGS. 3A, 3B and 3C.

As can be seen in FIGS. 4A and 4C, recording head 400 includes a single heat sinking layer 412, which is entirely in a pocket 434. In this embodiment, instead of patterning (e.g., etching) a pocket into substrate 104 (as in recording head 300 described above in connection with FIGS. 3A-3C), the pocket 434 is obtained by adding material above the substrate. Thus, basecoat layer portions 402a and 402b are deposited above substrate 104, and the heat sinking layer 412 is formed within the pocket 434. In some embodiments, the basecoat layer portions 402a and 402b may be formed of a same material (e.g., AlOTiC) as the substrate 104. In other embodiments, the basecoat layer portions 402a and 402b may be formed of a different material than the substrate 104. For example, the substrate 104 may be formed of AlOTiC and the basecoat layer portions 402a and 402b may be formed of SiC. Electrically insulative material 114 above the basecoat layer portions 402a and 402b and the heating sinking layer 412 may be formed of $Al_2O_3$. In a particular embodiment, dimensions of pocket 434 and heat sinking layer 412, which are denoted by reference numerals 404, 406 and 408 in FIG. 4B, are about 5 µm, 180 µm and 40 µm, respectively. It should be noted that, in the embodiment of FIGS. 4A, 4B and 4C, the thickness 404 of the heat sinking layer 412 is the same or substantially the same as a thickness of the basecoat layer 402a, 402b. In general, pocket 434 may have any suitable dimensions. In FIG. 4C, a distance from a bottom of the pocket 434 and a bottom of reader shield 122 is denoted by reference numeral 410. In a particular embodiment, distance 410 is about 11 µm. In general, any suitable distance 410 may be employed.

Figure 5:
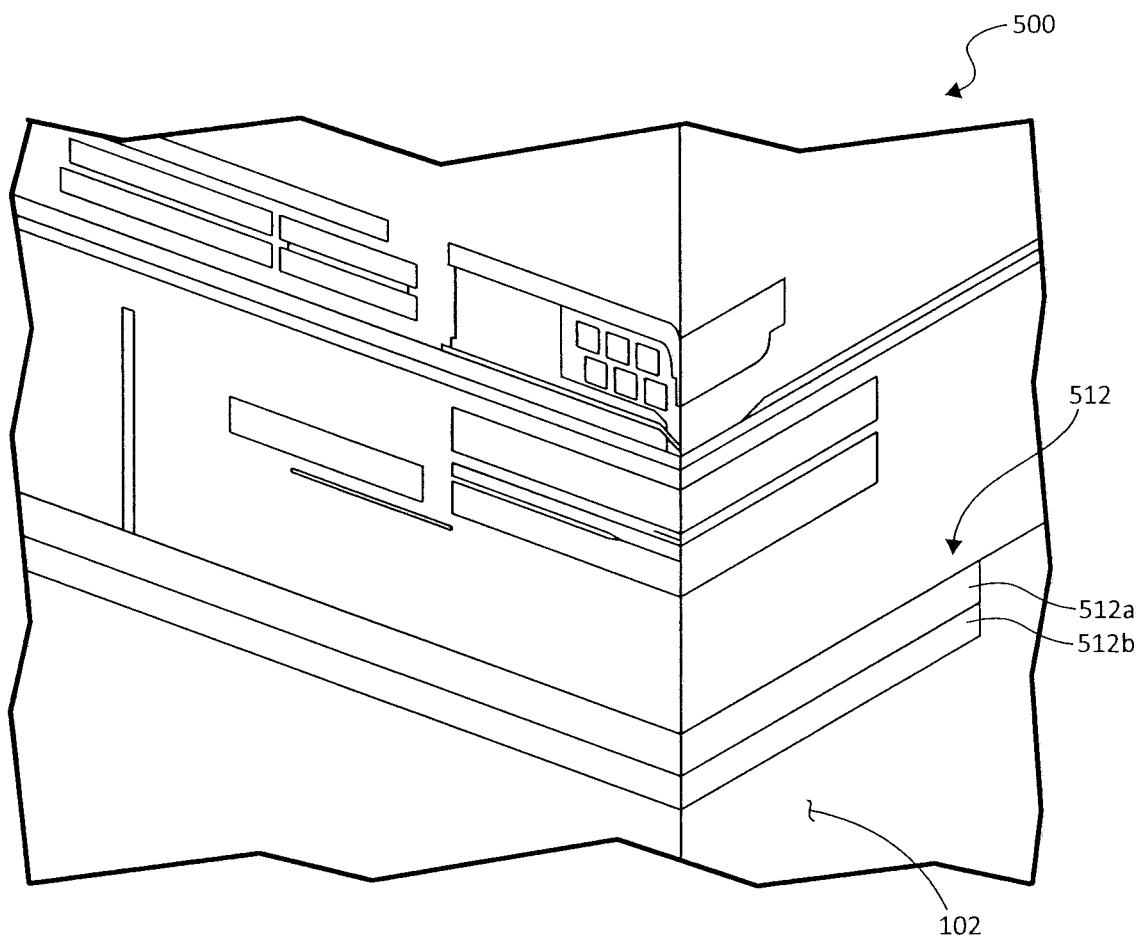
FIG. 5 is a perspective, cross-sectional view of an embodiment of a recording head.

FIG. 5 is a perspective, cross-sectional view of an embodiment of a recording head 500 with a media-facing surface 102, with the section plane taken normal to the media-facing surface 102. Recording head 500 includes elements similar to those included in recording heads 100 (of FIG. 1), 200 (of FIG. 2A), 300 (of FIG. 3A) and 400 (of FIG. 4A) and therefore, in the interest of brevity, a description of the similar elements is not repeated.

Recording head 500 includes a bi-layered heat sink 512, which includes a bottom heat sinking layer 512b formed on a planar upper surface of substrate 104, and a top heat sinking layer 512a formed on the bottom heat sinking layer 512b. Bottom heat sinking layer 512b may be formed of a different material than top heat sinking layer 512a, thereby providing a "composite" heat sink 512 that combines desirable properties (e.g., thermal, mechanical, electrical, etc.) of two different materials. In alternate embodiments, one or both of layers 512a and 512b may be recessed from the media-facing surface 102. Also, in some embodiments, one or both of layers 512a and 512b may be partially or completely within a pocket (e.g., a substrate 104 pocket).

Figure 6:
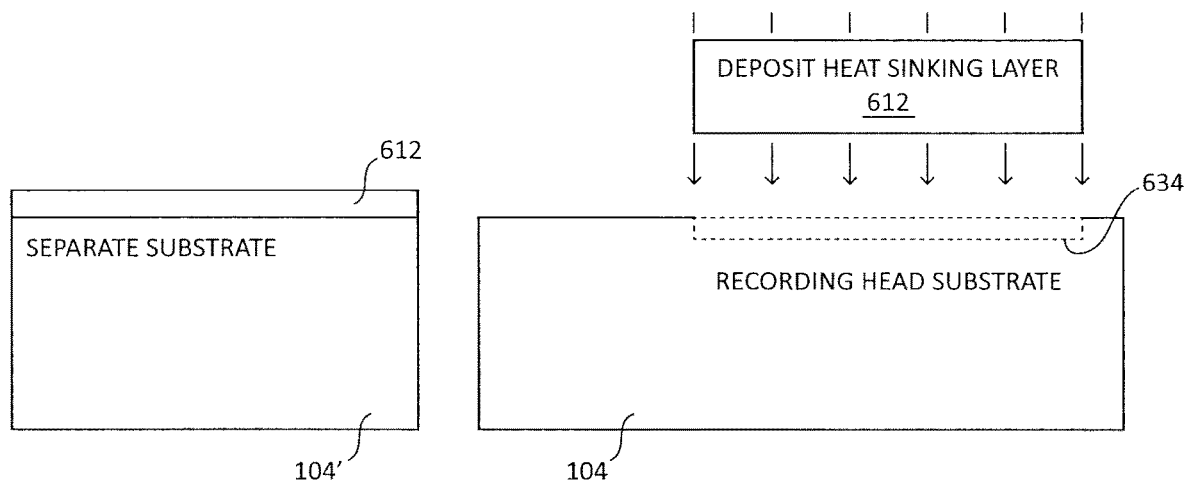
FIG. 6 is a diagrammatic illustration of methods of forming a heat sink in accordance with embodiments of the disclosure.

FIG. 6 is a diagrammatic illustration of methods of forming a heat sink in accordance with embodiments of the disclosure. A right side of FIG. 6 shows a recording head substrate 104 on which the heat sinking layer is formed. Substrate 104 may initially be formed such that it has a planar upper surface 600. In some embodiments, heat sinking layer 612 is formed by direct deposition of the heat sinking layer 612 material on the planar upper substrate 600. In other embodiments, such as embodiments that utilize diamond as the heat sinking layer 612 material, deposition processes may be carried out at temperatures high enough to damage the recording head substrate 104. Thus, in such embodiments, the heat sinking layer 612 may be fabricated (e.g., deposited) on a separate substrate 104', and then transfer-printed onto the final recording substrate 104, thereby protecting it from potential damage. In certain embodiments, before direct deposition or transfer printing, a pocket 634 may be etched into the substrate 104. This involves creating a pattern and milling down into the AlOTiC substrate 104. Thereafter, the direct deposition or transfer printing operations may be carried out.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A recording head comprising:
   one or more transducer elements;
   an electrically insulative layer encasing the one or more transducer elements;
   a substrate below the electrically insulative layer; and
   a heat sinking layer between the electrically insulative layer and the substrate,
   wherein the substrate is formed of a first material, the electrically insulative layer is formed of a second material that is different from the first material, and the heat sinking layer is formed of a third material that is different from the first and second materials, wherein the third material has a third thermal conductivity that is higher than at least one of a first thermal conductivity of the first material or a second thermal conductivity of the second material.

2. The recording head of claim 1 and further comprising a media-facing surface, and wherein a front end of the heat sinking layer is at the media-facing surface.

3. The recording head of claim 1 and further comprising a media-facing surface, and wherein a front end of the heat sinking layer is recessed behind the media-facing surface.

4. The recording head of claim 1 and wherein the heat sinking layer comprises a plurality of sub-layers.

5. The recording head of claim 1 and further comprising:
   a media-facing surface;
   a bottom shield positioned below the one or more transducer elements;

a heater element positioned below the bottom shield; and the electrically insulative layer encasing the heater element and the bottom shield, wherein the heater element is located behind the upper portion of the heat sinking layer relative to the media-facing surface.

6. The recording head of claim 1 and wherein the heat sinking layer comprises at least one of Cu, Au, AlN, diamond or sapphire.

7. A method of making a recording head, the method comprising:

forming a substrate;

forming a heat sinking layer over the substrate; and forming an electrically insulative layer over the heat sinking layer, wherein the substrate is formed of a first material, the electrically insulative layer is formed of a second material that is different from the first material, and the heat sinking layer is formed of a third material that is different from the first and second materials, wherein the third material has a third thermal conductivity that is higher than at least one of a first thermal conductivity of the first material or a second thermal conductivity of the second material.

8. The method of claim 7 and wherein a front end of the heat sinking layer is at a media-facing surface of the recording head.

9. The method of claim 7 and wherein a front end of the heat sinking layer is recessed behind a media-facing surface of the recording head.

10. The method of claim 7 and wherein forming the heating sinking layer comprises:

depositing the heat sinking layer on a separate substrate; and transferring the heat sinking layer from the separate substrate to the substrate of the recording head.

11. The method of claim 7 and wherein forming the heating sinking layer comprises forming a multi-layered heat sinking layer.

12. The method of claim 7 and wherein the heat sinking layer is formed of at least one of Cu, Au, AlN, diamond or sapphire.

13. A recording head comprising:

one or more transducer elements;

an electrically insulative layer encasing the one or more transducer elements;

a substrate below the electrically insulative layer; and a plurality of heat sinking layers between the electrically insulative layer and the substrate, wherein the substrate is formed of a first material, the electrically insulative layer is formed of a second material that is different from the first material, and at least one heat sinking layer of the plurality of heat sinking layers is formed of a third material that is different from the first and second materials, wherein the third material has a third thermal conductivity that is higher than at least one of a first thermal conductivity of the first material or a second thermal conductivity of the second material.

14. The recording head of claim 13 and wherein different heat sinking layers of the plurality of heat sinking layers have different sizes.

15. The recording head of claim 13 and further comprising a media-facing surface, and wherein a front end of at least one heat sinking layer of the plurality of heat sinking layers is at the media-facing surface.

16. The recording head of claim 13 and further comprising a media-facing surface, and wherein a front end of at least one heat sinking layer of the plurality of heat sinking layers is recessed behind the media-facing surface.

17. The recording head of claim 13 and further comprising:

a media-facing surface;

a bottom shield positioned below the one or more transducer elements;

a heater element positioned below the bottom shield; and the electrically insulative layer encasing the heater element and the bottom shield, wherein the heater element is located behind an upper-most heat sinking layer of the plurality of heat sinking layers relative to the media-facing surface.

18. The recording head of claim 17 and wherein an upper portion of the upper-most heat sinking layer and the heater element are in a same horizontal plane that is perpendicular to the media-facing surface and parallel to a plane of the substrate.

19. The recording head of claim 13 and wherein the heat sinking layer comprises at least one of Cu, Au, AlN, diamond or sapphire.

20. The recording head of claim 13 and wherein a height of a bottom-most heat sinking layer of the plurality of heat sinking layers is greater than a height of at least one other heat sinking layer of the plurality of heat sinking layers.

* * * * *